United States Patent
Huna

(10) Patent No.: US 6,944,273 B2
(45) Date of Patent: *Sep. 13, 2005

(54) APPARATUS AND METHOD FOR FUTURE TRANSMISSION OF DEVICE-INDEPENDENT MESSAGES

(75) Inventor: Emmanuel L. Huna, Daly City, CA (US)

(73) Assignee: Microsoft Corporation, Redmond, WA (US)

(*) Notice: Subject to any disclaimer, the term of this patent is extended or adjusted under 35 U.S.C. 154(b) by 24 days.

This patent is subject to a terminal disclaimer.

(21) Appl. No.: 10/198,624

(22) Filed: Jul. 18, 2002

(65) Prior Publication Data

US 2003/0068018 A1 Apr. 10, 2003

Related U.S. Application Data

(63) Continuation of application No. 09/268,524, filed on Mar. 11, 1999, now Pat. No. 6,438,217.

(51) Int. Cl.[7] .................................................. H04M 1/64
(52) U.S. Cl. ................................ 379/88.14; 379/88.23
(58) Field of Search ........................... 379/67.1, 88.11, 379/88.12, 88.13, 88.14, 88.17, 88.18, 88.22, 88.23, 90.01, 93.01, 93.15, 93.24; 709/217, 218, 219

(56) References Cited

U.S. PATENT DOCUMENTS

| | | |
|---|---|---|
| 5,608,786 A | 3/1997 | Gordon |
| 5,630,060 A | 5/1997 | Tang et al. |
| 5,646,982 A | 7/1997 | Hogan et al. |
| 5,652,789 A | 7/1997 | Miner et al. |
| 5,742,905 A | 4/1998 | Pepe et al. |
| 5,809,128 A | 9/1998 | McMullin |
| 5,870,454 A | 2/1999 | Dahlén |
| 5,872,926 A | 2/1999 | Levac et al. |
| 5,951,638 A | 9/1999 | Hoss et al. |
| 5,987,100 A | 11/1999 | Fortman et al. |
| 6,055,240 A | 4/2000 | Tunnicliffe |
| 6,134,454 A | 10/2000 | Foladare et al. |
| 6,157,924 A | 12/2000 | Austin |
| 6,181,781 B1 | 1/2001 | Porter et al. |
| 6,203,192 B1 | 3/2001 | Fortman |
| 6,233,318 B1 | 5/2001 | Picard et al. |
| 6,675,507 B2 | 1/2004 | Petruzzelli |

FOREIGN PATENT DOCUMENTS

EP   0 854 655 A2   7/1998

Primary Examiner—Scott L. Weaver
(74) Attorney, Agent, or Firm—Senniger Powers

(57) ABSTRACT

An apparatus and method are provided for entering and transmitting a message at a future delivery time to a receiving device that is coupled either to a telephony-centric network or to a data-centric network. The apparatus includes a message server, a data-centric network server, and a telephony-centric network server. The message server translates the message into a format compatible with the receiving device and initiates delivery of the message at the future delivery time. The data-centric network server transmits the message over the data-centric network and, if the receiving device is addressable over the data-centric network, then said data-centric network server delivers the message directly to the receiving device. The telephony-centric network server provides an interface between the data-centric network server and the telephony-centric network. If the receiving device is addressable by the telephony-centric network, then the telephony-centric network server receives the message from said data-centric network server and delivers the message to the receiving device over the telephony-centric network.

60 Claims, 8 Drawing Sheets

FIG. 3 PRIOR ART — CONVENTIONAL FUTURE MESSAGING MECHANISMS

APPARATUS AND METHOD FOR FUTURE TRANSMISSION OF DEVICE-INDEPENDENT MESSAGES

CROSS-REFERENCE TO RELATED APPLICATIONS

This application is a continuation of U.S. Ser. No. 09/268,524, filed Mar. 11, 1999 now U.S. Pat. No. 6,438,217, and is also related to the following co-pending U.S. patent applications which are hereby incorporated by reference:

| Application No. | Filing Date | Title |
| --- | --- | --- |
| 09/239,560 | Jan. 29, 1999 | Integrated Message Storage And Retrieval System Distributed Over A Large Geographical Area |
| 09/240,367 | Jan. 29, 1999 | A System And Method For Providing Unified Messaging To A User With A Thin Web Browser |
| 09/239,585 | Jan. 29, 1999 | Centralized Communication Control Center For Visually And Audibly Updating Communication Options Associated With Communication Services Of A Unified Messaging System And Methods Therefor |
| 09/239,584 | Jan. 29, 1999 | Computer-Implemented Call Forwarding Options And Methods Therefor In A Unified Messaging System |
| 09/240,893 | Jan. 29, 1999 | Interactive Billing System Utilizing A Thin Web Client Interface |
| 09/240,368 | Jan. 29, 1999 | System And Method To Manage Phone Sourced Messages Using A User Modifiable Field Associated With The Message |
| 09/240,434 | Jan. 29, 1999 | Method And Apparatus For Network Independent Initiation Of Telephony |
| 09/240,435 | Jan. 29, 1999 | Apparatus And Method For Device Independent Messaging Notification |
| 09/240,435 | Jan. 29, 1999 | Apparatus And Method For Channel-Transparent Multimedia Broadcast Messaging |
| 09/239,589 | Jan. 29, 1999 | Voice Access Through A Data-Centric Network To An Integrated Message Storage And Retrieval System |

DEFINITION OF TERMS

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, electronic mail (email), facsimile (fax), page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

Thin Web Client: A commonly employed web browser such as Internet Explorer or Netscape Navigator—JAVA enabled.

PSTN: Public Service Telephony-centric network, e.g., AT&T, MCI, Sprint-owned telco.

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

BACKGROUND OF THE INVENTION

1. Field of the Invention

This invention relates in general to the field of messaging, and more particularly to an apparatus and method for utilizing a data-centric network to deliver a message to a receiving device at a scheduled time, where the receiving device is coupled either to the data-centric network or to a telephony-centric network.

2. Description of the Related Art

The advent of the telephone at the turn of the century presented a new form of communication to the population at large. Whereas prior messages were delivered directly to a message recipient either by mail, telegraph, or personal courier, telephones introduced a new option for delivering a message. More urgent matters were treated immediately with a telephone message while less important matters were relegated to the mail. The option to call or write notwithstanding, a message originator still knew that the message itself was being delivered to a particular geographic location, presumably in the presence of a message recipient. One of the most elementary systems for delivering a message was known as a messaging service. To utilize such a service, the message originator selected message recipients and either wrote or dictated a message to an operator who, in turn, distributed the broadcast message serially to each message recipient over the telephony-centric network. If the nature of the message required that it be delivered at a particular time, then the operator simply held the message until it was time to deliver it.

The advent of automated voicemail systems provided the means to take the human element out of the loop. Using a voicemail system, a message originator could record a message from his/her telephone and subsequently enter the telephone numbers of recipients for the message. More advanced voice mail systems provided the capability to specify a delivery time for the message.

Facsimile (fax) machines expanded the messaging options for a user. Now with a machine connected to the telephony-centric network, the user could convert a written page into electrical signals to be transmitted to a like machine over the telephony-centric network. The like machine would then translate the electrical signals back to text form and print out the transmitted page, thus delivering a textual message in a textual format. Higher end fax machines allow the user to prescribe a delivery time for an entered fax, which is a very useful feature since long distance rates are typically lower during the night. By delaying transmission of faxes until nighttime, a user can save money.

Though perhaps the most revolutionary series of events to advance the art of messaging has been the development of computer networking technologies resulting in what Is now known as the internet, along with related audio recording, storage, and transmission techniques. Today a user can access the internet from virtually anywhere in the world and retrieve electronic mail (email) in text form or in voice form. Delayed messaging, or future messaging, can be implemented on a desktop or laptop computer by purchasing special-purpose software that allows the user to additionally prescribe a delivery time for a created message. Delayed email messages are extremely useful tools for scheduling task management applications.

Cellular phones and pagers also provide a user with the ability to send and receive messages from other than a fixed location. Cellular phone and pager technologies are on the verge of providing worldwide coverage. It will soon be possible to call or page a message recipient anywhere in the world.

But in spite of the above noted advances, several problems still exist. A first problem relates to restricted distribution of a message. More specifically, a message that is entered from a device connected to the telephony-centric network, i.e., a device having an assigned telephone number, is restricted for delivery to devices that are also connected to the telephony-centric network. A device with a telephone number is designed to distribute messages similar devices having telephone numbers.

Likewise, a message that is entered from a device connected to the Internet or similar data-centric network, i.e., a device having an assigned Internet Protocol (IP) address, is restricted for delivery to devices that are also connected to the Internet. A device with an IP address is designed to distribute messages to similar devices having IP addresses.

A second problem is that future messaging features are not viable from a cost standpoint for the average consumer. A sole proprietor or small business entrepreneur is most often not in the position to retain a messaging service or to acquire high end capitol equipment, for the sole purpose of obtaining future messaging capabilities. He/She chooses rather to live without the capability and depend upon whatever capabilities exist in the competitive marketplace. Cost-competitive voice mail systems do not provide future messaging capabilities. To obtain delayed fax and email capabilities he/she is required to purchase special-purpose hardware and/or software.

A third problem regards the format translation for messages. Since techniques are now available to transmit both voice and text messages over both the telephony-centric network and the Internet, it is essential that messages for a particular recipient be provided in a format that is compatible with the particular recipient's receiving device. For example, a computer can function as a facsimile machine, but to provide fax capability on the computer, special-purpose application software is required to translate facsimile format to a format that can be viewed on a computer monitor.

Consequently, if a user today desires to send a message at a specified delivery time to recipients, the user must enter, schedule, and transmit the message on an originating device that is compatible with the receiving device, that possesses future messaging features, and that is part of the same network (i.e., telephony-centric network or data-centric network) as the receiving device. The situation is exacerbated when the message has multiple recipients. A first message must be broadcast to recipients on the telephony-centric network and a second message must be broadcast to recipients over the Internet.

Therefore, what is needed is an apparatus for sending a message to a receiving device at a future delivery time, where the message format and transmission network are transparent to the message originator.

In addition, what is needed is an apparatus providing the capability to enter a future message in email format and to have the message delivered to a telephone in voicemail format.

Furthermore, what is needed is an apparatus for transmitting a future message to a number of recipients having receiving devices that are addressable over both the telephony-centric network and a data-centric network.

Moreover, what is needed is a method for transmitting a future message that permits a message originator to specify a delivery time and recipients, where the recipients can be addressed by a telephone number or a data-centric network address.

SUMMARY

To address the above-detailed deficiencies, it is a feature of the present invention to provide a messaging system for sending a message to a receiving device at a future delivery time, where the receiving device is coupled to either a telephony-centric network or to a data-centric network.

Accordingly, the present invention provides an apparatus for sending a message to a receiving device, where the receiving device is coupled to either a data-centric network or a telephony-centric network. The apparatus includes a message server, a data-centric network server, and a telephony-centric network server. The message server translates the message into a format compatible with the receiving device and initiates delivery of the message at a delivery time. The data-centric network server is coupled to the message server. The data-centric network server transmits the message over the data-centric network. If the receiving device is addressable over the data-centric network, then the data-centric network server delivers the message to the receiving device. The telephony-centric network server is coupled to the data-centric network server. The telephony-centric network server interfaces the data-centric network server to the telephony-centric network. If the receiving device is addressable by the telephony-centric network, then the telephony-centric network server receives the message from the data-centric network server and delivers the message to the receiving device over the telephony-centric network.

A benefit of the present invention is that a user is not required to retain a messaging service or to acquire special-purpose hardware/software to obtain future messaging capabilities.

In another aspect, the present invention provides a mechanism for sending a message to a receiving device, where the receiving device is coupled to either a data-centric network or a telephony-centric network. The mechanism has a message server and a data-centric network server. The message server translates the message into a format compatible with the receiving device and initiates delivery of the message. The message server has a message scheduler that causes the message server to initiate delivery of the message at a delivery time, the delivery time being specified within the message. The data-centric network server is coupled to the message server and transmits the message over a data-centric network for delivery to the receiving device.

Another benefit of the present invention is that a user is provided with device-independent future messaging capabilities. No longer is he/she required to restrict delivery of messages only to those receiving devices that are addressable over the same network the device used to originate a message.

In a further aspect, the present invention provides a system for sending a message at a specified delivery time to a receiving device. The system includes a message scheduler, a message server, a data-centric network server, and a data-centric network. The message scheduler initiates delivery of the message at the specified delivery time. The message server is coupled to the message scheduler and translates the message into a format that is compatible with the receiving device. The data-centric network server is coupled to the message server and transmits the message. The data-centric network is coupled to the data-centric network server. The data-centric network routes the message from the data-centric network server to either the receiving device or a telephony-centric network server, wherein, if the receiving device is addressable over a telephony-centric network, then the data-centric network routes the message to the telephony-centric network server.

A further benefit of the present invention is that a user can configure and execute voicemail messages to himself/herself throughout the day to provide administrative prompts and reminders.

In yet another aspect, the present invention provides a method for sending a message at a delivery time to a receiving device that is coupled either to a data-centric network or a telephony-centric network. The method includes generating the message from an originating device, the message prescribing the receiving device and the delivery time; translating the message into a format that is compatible with the receiving device; at the delivery time, transmitting the message over a data-centric network; and delivering the message to the receiving device.

Yet another benefit of the present invention is that a message originator can enter a message for future transmission to a recipient, without having to be concerned about the network over which the message is transmitted.

BRIEF DESCRIPTION OF THE DRAWINGS

These and other features, and benefits of the present invention will become better understood with regard to the following description, and accompanying drawings where.

DETAILED DESCRIPTION

In light of the above background on messaging techniques and mechanisms, several related art examples will now be discussed with reference to FIGS. 1 through 3. These examples illustrate how present day messaging systems confine delivery of a future, or delayed, message to recipients having receiving devices that are connected to the same communication network as the messaging system, a specific obstacle being the inability to direct a future message to either a data-centric network addressee (e.g., electronic mail) or a telephony-centric network addressee (e.g., voicemail). Following this discussion, a detailed description of the present invention will be provided with reference to FIGS. 4 through 8. The present invention permits a user to address a future message for delivery to either data-centric network devices or telephony-centric network devices, or both types of devices. Moreover, the present invention delivers the future message at a specified delivery time to all recipients over communication channels that are transparent to the message originator. The message is delivered to each recipient in a form (e.g., email, facsimile, voicemail) that matches his/her receiving device.

Figure 1:
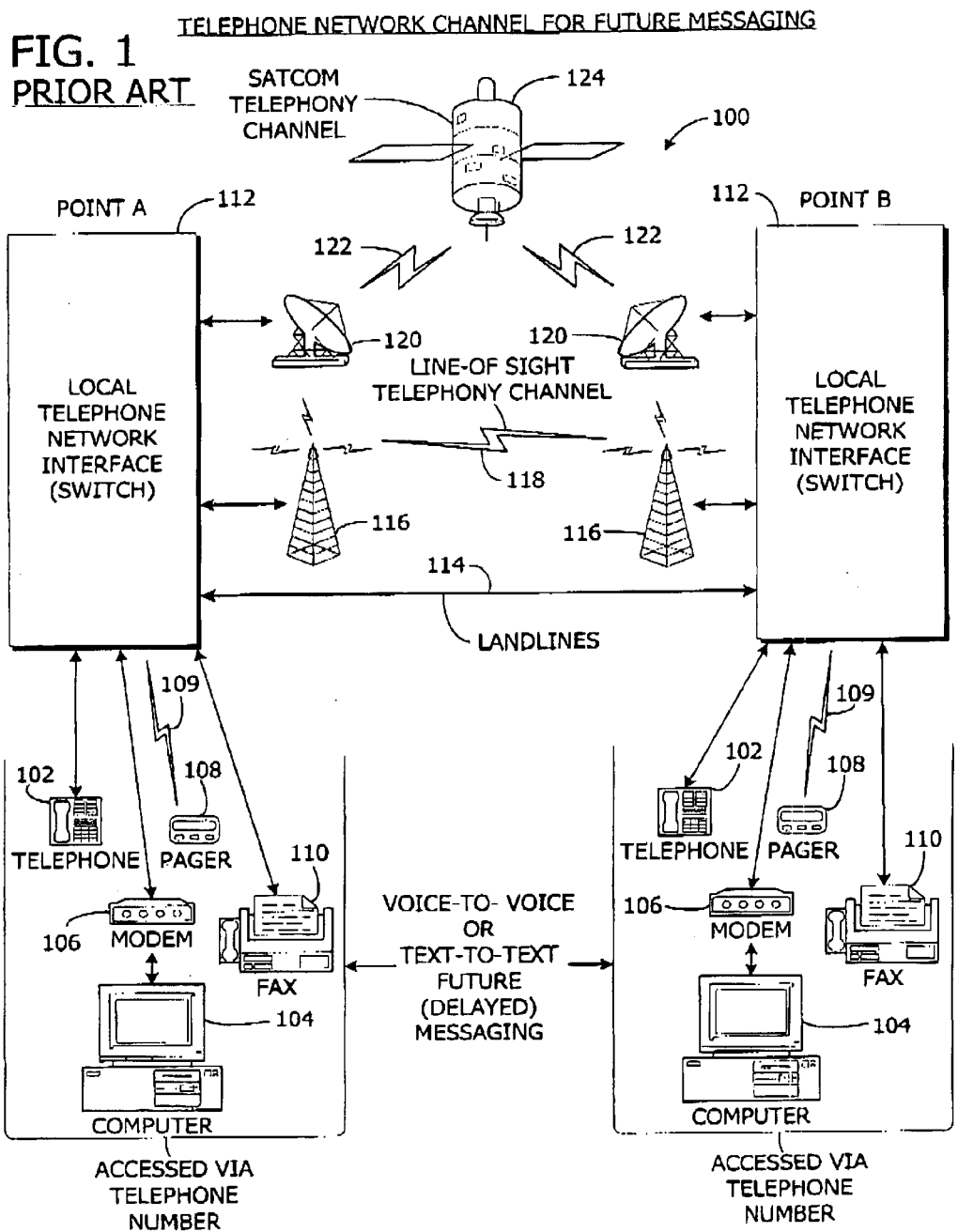
FIG. 1 is a block diagram illustrating related art mechanisms for delivering a future message to a recipient over a telephony-centric network.

Referring to FIG. 1, a block diagram 100 is presented illustrating related art mechanisms for delivering a future message to a recipient over a telephony-centric network. The block diagram 100 shows two local telephony-centric network interfaces 112, one 112 at POINT A and one 112 at POINT B. The telephony-centric network interface 112 is also referred to as a local switch 112. The block diagram 100 additionally depicts various devices connected to the local telephony-centric network interfaces 112: a telephone 102, a pager 108, a facsimile (fax) machine 110, and a modem 106 that provides connectivity for a computer 104. The block diagram 100 shows three channels for transmitting telecommunication signals: a hardwired channel 114, a radio frequency (RF) line-of-sight (LOS) channel 118, and a satellite communications (SATCOM) channel 122.

In operation, each of the devices 102, 108, 110, 106/104 are provided with a unique address, or telephone number, so that they may be readily accessed by the local telephony-centric network interface 112 for message transmission and receipt. The local switch 112 is the point where local telecommunication devices 102, 108, 110, 106/104 interface to the telephony-centric network communication channels 114, 118, 122. A transmitting local device, say a telephone 102 at POINT A, sends a message to a compatible receiving device, say a telephone 102 at POINT B, by providing a telephone number assigned for the receiving device 102 at POINT B to the local switch 112 at POINT A. The local switch 112 at POINT A then transmits the message to the local switch 112 at POINT B via the hardwired channel 114, the RF LOS channel 118, the SATCOM channel 122, or a combination thereof. The local switch 112 at POINT B then delivers the message to the receiving device 102. For a given message, routing logic (not shown) within the local switch 112 at POINT A determines which telephony channel 114, 118, 122 or combination of channels 114, 118, 122 to use for the transmission. This determination is based upon a number of factors to include the geographic separation of POINT A and POINT B and the availability of a channel 114, 118, 122 at the time the given message is transmitted. For example, a first message from San Francisco to San Jose, because the two points are only a few miles apart, may be transmitted over the hardwired, or landline, channel 114. This channel 114 modulates electrical signals over wires or fiber-optic cables to communicate the first message between San Francisco and San Jose. A second message from San Francisco to Los Angeles, because the two points are separated by hundreds of miles, may be transmitted over the RF LOS channel 118. This channel translates electrical signals provided by the local switch 112 in San Francisco to RF signals and transmits the second message between a number of RF LOS antennas 116 for delivery to Los Angeles. The RF signals are then translated back to electrical signals compatible with receiving devices in Los Angeles. A third message from San Francisco to Paris, because the two points are separated by thousands of miles, may be transmitted over the SATCOM channel 122. This channel translates electrical signals provided by the local switch 112 in San Francisco to RF signals and transmits the third message between a transmitting satellite antenna 120 to a satellite 124 above the Earth. The satellite 124 relays the third message to a receiving satellite antenna 120 near Paris. The RF signals are then translated back to electrical signals compatible with receiving devices in Los Angeles. One skilled in the art will appreciate that many factors influence the channel medium 114, 118, 122 chosen for transmission of a given message over the telephony-centric network and that the choice of medium 114, 118, 122 is transparent to both the message originator and the message recipient. A message between San Francisco and Paris could just as well be transmitted by landlines 114 as by a satellite 124-what the originator and recipient hear is words spoken over a telephone 102.

Regardless of which channel 114, 118, 122 is provided for transmission of a message, it is important to note that the local switch 112 is the point of interface to the telephony-centric network and that each device 102, 108, 110, 106/104 connected to the network is accessed, or addressed, by a unique telephone number. To be accessed, that is, to transmit and receive messages, a device 102, 108, 110, 106/104 must be connected to the telephony-centric network and must have an assigned telephone number. Use of the telephone number is the only way to address a device 102, 108, 110, 106/104. Moreover, a device 102, 108, 110, 106/104 connected to the telephony-centric network may not be accessed via any other network except through a corresponding local switch 112.

Although messages via the telephony-centric network are modulated for reliable transmission over a particular telephony channel 114, 118, 122, the format of such messages can differ. For instance, digitized voice files are normally transmitted between two telephones 102, thus providing voice-to-Voice messaging. One skilled in the art will appreciate that there are several digitized voice file formats in use today and that off-the-shelf products are available for translation from one file format to the next. But voice-to-voice messaging is not the only form of messaging over the telephony-centric network; text-to-text messaging is also available. A textual item may be encoded by a fax machine 110 at POINT A and then transmitted to a compatible fax machine 110 at POINT B, thus achieving text-to-text messaging. Yet, file formats for a fax are different than for digitized voice. And like digitized voice, a number of file formats are in use today. Virtually all present day fax machines 110 provide transparent translation between all of the fax file formats.

A pager 108 provides the capability to receive a textual message that has been created via a telephone keypad or similar alphanumeric entry device. The pager 108 is actually addressed over an RF paging channel 109 rather than a landline 114. As a result, a recipient within range of the RF paging channel 109 can be provided with a message in written form that has been entered from a telephone 102. Like the telephone 102 and fax machine 110, several message file formats are in use today for pagers 108.

The computer 104 provides the capability to send either a voice format message or a text format message over the telephony-centric network. The modem 106 interfaces the computer 104 to a local switch 112 and modulates voice and text files provided by the computer 104 into electrical signals suited for transmission over the telephony-centric network. Most present day computers 104 that are connected to the telephony-centric network provide the capability to transmit and receive a voice message, or voice mail, and to transmit and receive a text message in the form of an electronic file or a fax. Readily available software programs for computer communications applications provide the capability to translate a fax file format to a format for display on a computer monitor (not shown).

It is also possible to send a message over the telephony-centric network to more than one receiving device 102, 106/104, 108, 110. A message addressed to more than one receiving device 102, 106/104, 108, 110 is called a broadcast message. In essence, the broadcast message is entered once from an originating device 102, 106/104, 108, 110 and is then broadcast to selected recipients. In practice, however, the broadcast message is actually translated into individual messages corresponding to each message recipient and the individual messages are subsequently transmitted to each message recipient over the telephony-centric network. For example, it is trivial to address a fax to several receiving fax machines 110 or computers 104 by providing the corresponding telephone numbers to the broadcast fax machine 110. The broadcast fax machine 110 then contacts each recipient individually over the telephony-centric network. A more complex case is illustrated by a message originator broadcasting a voicemail to both a receiving computer 104 and a receiving telephone 102 by entering a voice message into an originating computer 104 and selecting the telephone numbers corresponding to the intended recipients. When a voice message is immediately transmitted to more than one telephone or equivalent receiving device, the call session is referred to as a conference call. When the voice message is not immediately transmitted, but rather delayed for transmission at a future time, what transpires is known as a voice mail broadcast.

In general, messages that are not immediately delivered, but rather are specified to be delivered at a later time, are referred to as future messages, or delayed messages. Future messaging is prevalently used today both as a cost savings technique and as an administrative mechanism. With regard to cost savings, several facsimile programs for desktop computers provide the capability to specify a delivery time for generated faxes, thereby enabling a message originator to take advantage of nighttime long distance rates, which are most often lower than daytime rates. Regarding administrative uses of delayed messaging, the wake-up call is a good example: A businessperson checks into a hotel for the evening and calls the front desk to request a wake-up call for a specified time the next morning. The following morning, a hotel operator or special-purpose voicemail system places a call to the businessperson at the specified time, thus providing an administrative prompt to the businessperson to initiate a new task, i.e., to wake up.

One skilled in the art will appreciate that other variations exist that are not discussed above for future messaging over the telephony-centric network to include voice-to-text and text-to-voice translations. Such translations are provided for the hearing impaired via a TTY device connected to the telephony-centric network. However, in all cases, to address a message to any device 102, 106/104, 108, 110 over the telephony-centric network requires the provision of telephone numbers for each receiving device.

The telephony-centric network has been predominately used for commercial messaging since the early 1900's. But as of the mid-1980's commercial messaging practices began to change with the advent of the internet. The internet is a worldwide network of computers connected together via a data-centric network, the data-centric network being distinct from the telephony-centric network. And the primary factor that distinguishes devices connected to the internet from those connected to the telephony-centric network is that the devices connected to the internet are not addressed by telephone numbers; they are addressed with a designator called an internet protocol (IP) address. A more detailed description of messaging over a data-centric network is provided with reference to FIG. 2.

Figure 2:
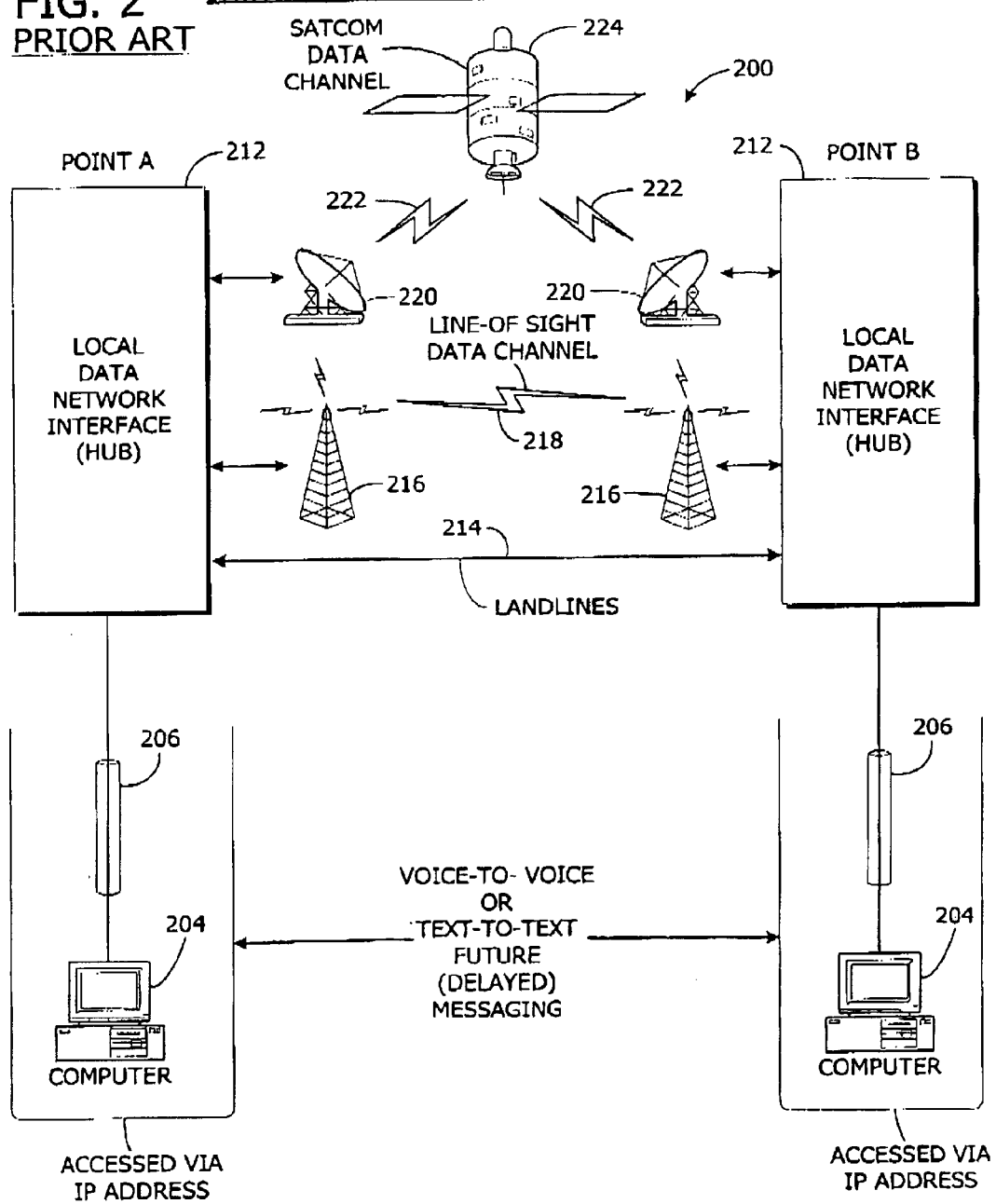
FIG. 2 is a block diagram illustrating related art mechanisms for delivering a future message to a recipient over a data-centric network.

Referring to FIG. 2, a block diagram 200 is presented illustrating related art mechanisms for delivering a future message to a recipient over a data-centric network. The block diagram 200 shows two local data-centric network interfaces 212, one 212 at POINT A and one 212 at POINT B. The block diagram 100 also depicts computers 204 connected to the local data-centric network interfaces 112 via data-centric network medium 206. The data-centric network medium 206 can be a local area network, a wide area network, a cable modem, or any of a number of present day mechanisms for connecting a computer 204 to a data-centric network. Like the telephony-centric network of FIG. 1, three data communication channels are shown: a hardwired channel 214, a radio frequency (RF) line-of-sight (LOS) channel 218, and a satellite communications (SATCOM) channel 222.

In operation, each computer 204 connected to the data-centric network is provided with a unique IP address so that it may be readily accessed by the local data-centric network interface 212. The local data-centric network interface 212 is also called a local hub 212. The local hub 112 is the point where a computer 204 interfaces to the data-centric network communication channels 214, 218, 222. A transmitting computer 204 at POINT A sends a message to a receiving computer 204 at POINT B by providing an IP address assigned to the receiving computer 204 at POINT B to the local hub 212 at POINT A. The local hub 212 at POINT A then transmits the message to the local hub 212 at POINT B via the hardwired channel 214, the RF LOS channel 218, the SATCOM channel 222, or a combination thereof. The local hub 212 at POINT B subsequently delivers the message to the receiving computer 204. For a given message, routing logic (not shown) within the local hub 212 at POINT A determines which data-centric network channel 214, 218, 222 or combination of channels 214, 218, 222 to use for transmission. This determination is based upon a number of factors to include the geographic separation of POINT A and POINT B and the availability of a channel 214, 218, 222 at the time the given message is transmitted. Operation of each of the data-centric network channels 214, 218, 222 and their associated elements 216, 220, 224 is similar to like telephony-centric network elements of FIG. 1, the hundreds digit being replaced with a 2. One skilled in the art will likewise appreciate that many factors influence the medium 214, 218, 222 chosen for transmission of a given message over the data-centric network and that the choice of medium 214, 218, 222 is transparent to both the message originator and the message recipient. A message between San Francisco and Paris could just as well be transmitted by landlines 214 as by a satellite 224.

Regardless of the data channel 214, 218, 222 provided for communication of a message, it is important to note that the local hub 212 is the point of interface to the data-centric network and computers 204 connected to the network are addressed by unique IP addresses. To be accessed, that is, to transmit and receive messages, a computer 204 must be connected to the data-centric network and must have an assigned IP address. Use of the IP address is the only way to address a computer 204 connected to the data-centric network. Moreover, a computer 204 connected to the data-centric network may not be accessed via any other network except that the access occurs through a local hub 212.

Although messages via the data-centric network are modulated for reliable transmission in accordance with a particular data-centric network channel 214, 218, 222, the format of such messages can differ. For instance, technology advances permit digitized voice files to be transmitted between two computers 204, thus providing voice-to-voice messaging. One skilled in the art will appreciate that there are several digitized voice file formats in use today and that off-the-shelf products are available for translation from one file format to the next. These formats include wave format (i.e., .wav files) and real-audio format (.ra files). Yet the most prevalent form of messaging exercised by computers 204 today is text-to-text messaging. A textual item is entered into a computer 204 at POINT A and then transmitted to a computer at POINT B, thus achieving text-to-text messaging, principally in email format. And though several email formats are used today, most present day computer communication provide transparent translation and presentation of both voice and text messages for virtually all of the various formats.

Like messaging over the telephony-centric network, it is possible to send a broadcast message over the data-centric network to more than one receiving computer 204. In fact, present day email software applications make it possible to enter one textual message, or to record a voice message, and then broadcast the message to numerous recipients simply by specifying their corresponding addresses. Yet, similar to broadcasting over the telephony-centric network, a data-centric network broadcast message is actually translated into individual messages corresponding to each message recipient and the individual messages are subsequently transmitted to each message recipient over the data-centric network.

Future messaging has been employed over a data-centric network, yet only in a limited sense. This is because common desktop computer communications programs do not provide the capability for a user to prescribe a time-to-transmit, or delivery time, for a message. Some commercial computing entities maintain special-purpose application programs that do provide the capability to prescribe delivery times for large batches of messages, such as solicitations and the like, but on the whole, delayed messaging capabilities are not provided for an end user.

Many software applications known as personal information managers (PIMs) provide a user with the ability to link a calendar event with a programmed response such as transmission of an email message. To schedule a delivery time for a message using this approach, one would create a calendar event to occur at the delivery time, say an event entitled "SEND MESSAGE." Then the message to be transmitted would be linked to the calendar event. Consequently, when the delivery time occurs, the email message would be sent. Although it is possible to schedule future delivery of a message in this manner, it is not very practicable. First, the user is required to purchase PIM software because such software is not common to desktop computer systems. Furthermore, each time the user desired to send a future message, he/she would be required to create a corresponding calendar event.

One skilled in the art will appreciate that a number of variations exist for broadcast messaging over the data-centric network that are not discussed above, to include voice-to-text and text-to-voice translations. And there are a number of special-purpose devices that can be connected to the data-centric network for special communication scenarios. These devices are referred to in the larger sense in this application simply as computers 204 because to address a broadcast message to such devices 204 over the data-centric network requires the provision of an IP address for each message recipient.

It is also well understood that telephonic communication channels 114, 118, 122 are the primary channels for transmission of information over the internet and other private data-centric networks. Nevertheless, though telephone channels 114, 118, 122 function as the backbone of a data-centric network, the distinction cited above remains: to address a message to a computer 204 or other device connected to a data-centric network, the recipient's IP address must be provided to a local interface 212 to the data-centric network.

Enabling technologies have proliferated in more recent years to the extent that the lines between telephony-centric network messaging and data-centric network messaging are becoming blurred, particularly from the standpoint of a user. A message originator desires to enter a message one time, in a format compatible with his/her data entry device, and then transmit this message to one or more recipients, without regard to the unique characteristics of receiving devices. The message originator furthermore has no interest in whether the receiving device is a telephone 102 connected to the telephony-centric network, or a computer 204 connected to the data-centric network, or some other device having either an IP address or a telephone number assigned to it. His/Her chief desire is to communicate information to recipients, not to interact with a host of disparate receiving devices. In addition, for cost control or administrative purposes, the message originator desires to specify a delivery time for each message that is generated. However, in spite of recent advances in the art, a number of obstacles have yet to be overcome that allow such seamless future messaging to occur. FIG. 3 summarizes the present day capabilities and limitations of future messaging between telephony-centric network devices and data-centric network devices.

Figure 3:
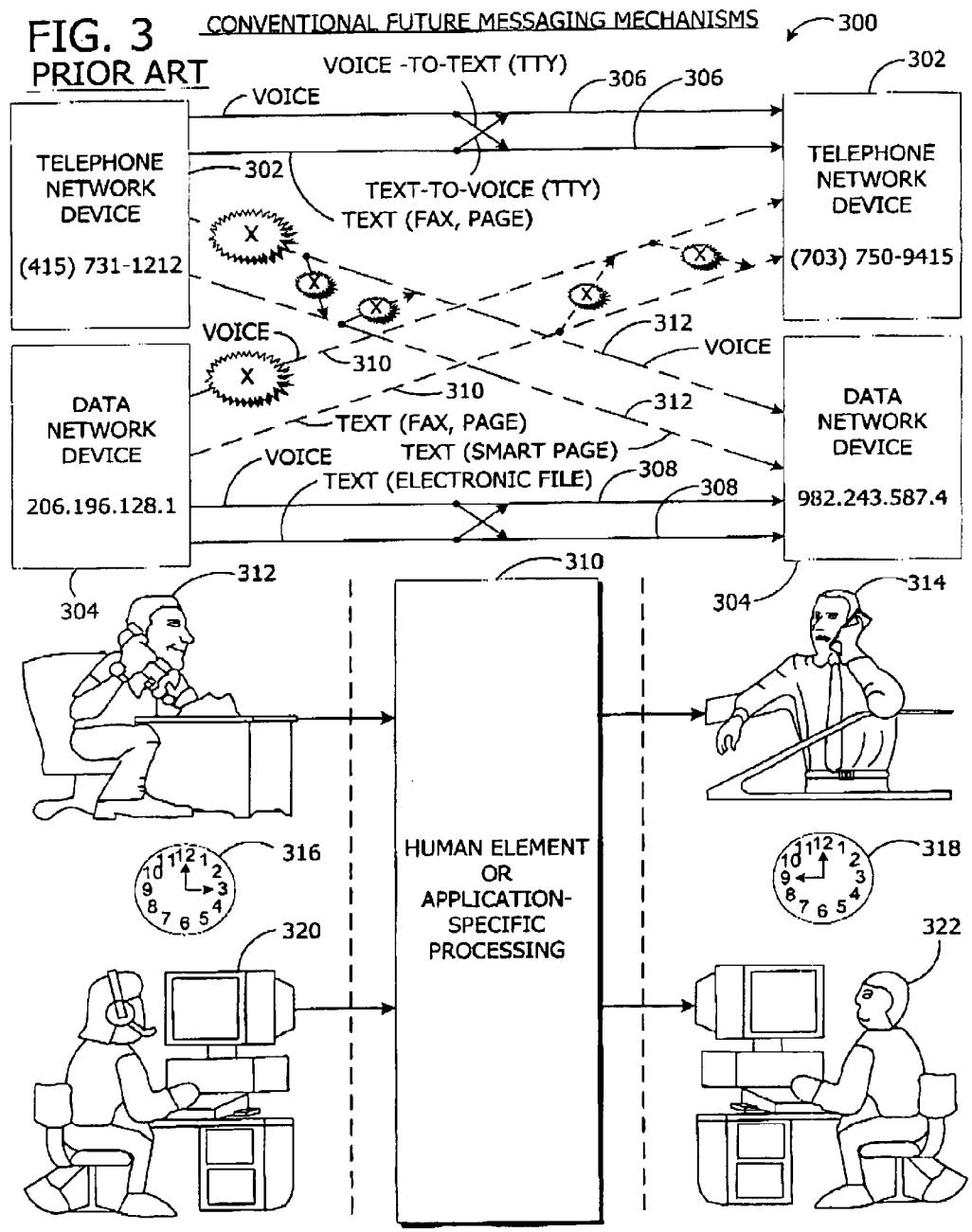
FIG. 3 is a diagram illustrating related art future messaging capabilities for delivery to recipients over the telephony-centric network and the data-centric network.

Referring to FIG. 3, a diagram 300 is presented illustrating related art future messaging capabilities for delivery to recipients over the telephony-centric network and the data-centric network. The diagram 300 shows two telephony-centric network devices 302: a first device 302 having a telephone number of (415)731-1212 and a second device 302 having a telephone number of (705)750-9415. The diagram 300 also depicts two data-centric network devices 304: a first data-centric network device 304 having an IP address of 206.196.128.1 and a second data-centric network device 304 having an IP address of 982.243.587.4. The diagram 300 also depicts two telephony-centric network communication channels 306: a voice form channel 306 and a text form channel 306. Two data-centric network communication channels 308, a voice form channel 308 and a text form channel 308 are also presented. Two data-to-telephony-centric network channels 310 are depicted in the diagram 300 along with two telephone-to-data-centric network channels 312. The inter-network channels 310, 312 are depicted as dotted lines in the diagram 300 because such channels 310, 312 are presented only for the purposes of discussion; present day implementations of inter-network channels 310, 312 exist only at a rudimentary level. The diagram 300 also depicts two message originators 312, 320: one 312 coupled to a telephony-centric network and another 320 coupled to a data-centric network. The diagram 300 additionally shows two message recipients 314, 322: one 314 coupled to a telephony-centric network and another 322 coupled to a data-centric network. The diagram moreover shows a first clock 316 depicting an origination time and a second clock 318 depicting a delivery time. The diagram 300 also shows an intervention apparatus 310 that must be provided to enable future transmission of messages. The intervention apparatus 310 may be a special-purpose piece of equipment, special-purpose software running on a desktop computer, or a human being.

Operationally, as was discussed with reference to FIG. 1, it is possible today to send future messages in both voice form and text form over telephony-centric network devices 302. For future transmission of voice messages, i.e., voicemail, telephones 302 are most often used to originate and receive. For future transmission of fax messages, fax machines 302 are most often used to originate and receive. A computer equipped with a modem 302 or fax modem 302 can be used to originate or receive either voicemail or facsimiles. Both voice form messages and text form future messages are transmitted over the telephone communication channels 306. Recipients of such messages are addressed by their corresponding telephone number.

But a computer 302 connected to the telephony-centric network must have special-purpose software installed to translate voice-to-text format or text-to-voice format. Hence, without special-purpose software, a voicemail received by a computer 302 must be heard, not read. Furthermore, a fax must be read, not heard. Special-purpose software is available to provide voice-to-text and text-to-voice translation, for example as a TTY aid for the deaf, but such software is rarely found in desktop computing systems.

As was discussed with reference to FIG. 2, it is possible today to broadcast both voice form and text form messages over data-centric network devices 304. For broadcasting of voice messages, i.e., broadcast voicemail, computers 304 are most often used to originate and receive. Digitized voice file formats are used by the computers 304 to send and receive streaming audio. Email is the most common embodiment of text form messaging over data-centric network channels 308 today. And although email addressing mechanisms are presented to a user in the form of an email address like joe@pto.gov, one skilled in the art will comprehend that the email itself is routed to a specific computer 304 having a unique IP address. To translate voice to text or text to voice, as was discussed above, requires special-purpose software not commonly found in desktop systems 304.

Present day techniques do not allow a user to direct a voice format message from a telephone 302 connected to the telephony-centric network to a receiving device 304 connected to a data-centric network. But it is possible to direct a text format message from a device 302 called a smart pager 302 to a receiving device connected to a data-centric network-however only with human intervention. For example, a smart pager user types in a message on his/her smart pager 304 and selects an email address of a recipient. The message is broadcast over the telephony-centric network to a paging center, where a technician intercepts and forwards the message to a recipient over the data-centric network. It is also not possible to enter a voice message over a telephony-centric network device 302 and deliver it as a text format message to a data-centric network device 304. Furthermore, a user cannot enter a text message from a telephony-centric network device 302 and deliver it as a voice message to a data-centric network device, without the employment of special translation software.

Mechanisms do exist today to send a fax or a page from a data-centric network device 304 to a telephony-centric network device 302. The fax and page are entered and received in text format. Special-purpose translation software is required to perform text-to-voice translation. Present day mechanisms do not provide the capability for a user to enter a voice message over a data-centric network device and deliver it to a telephony-centric network device.

With regard to scheduling and transmitting future messages, any of the available techniques discussed with reference to FIG. 3 can be used, however, to do so proves cumbersome or costly to a message originator because the intervention apparatus 310 is required to delay transmission of a message until a specified delivery time. In the simple, yet costly case, the intervention apparatus 310 takes the form of a paid message operator. At the origination time shown on the origination clock 316, the telephone message originator 312 calls the paid message operator 310 and prescribes the telephone number of the telephone recipient 314, the message content, and the specified delivery time. At the specified delivery time shown on the delivery clock 318, the paid message operator places a call to the telephone recipient 314 to deliver the message. With a paid message operator 310, it is also possible to transmit a future message from the telephone originator 312 to the data-centric network recipient 322.

Future messaging over a data-centric network typically requires intervention apparatus 310 in the form of special-purpose software. And with custom intervention apparatus 310, it is possible to send a future message from a data-centric network originator 320 to a telephony-centric network receiver 314, the smart pager being one example of how this is done.

In summary, both the telephony-centric network and data-centric network extend virtually all around the world. And it is standard practice to send both voice format and text format messages over either network. But present day messaging systems do not provide a user with the capability to seamlessly transmit a message to a receiving device that is coupled either to the data-centric network or to the telephony-centric network, without intervention apparatus 310. Either an expensive messaging service is required, or the message originator is required to sent his message twice, once from a data-centric network device 304 and again from a telephony-centric network device 302. Furthermore, even if a recipient is within the same network as an originator, to schedule transmission of a message at a future delivery time requires an intervention apparatus 310, thus further limiting a user's ability to communicate.

The problems associated with future messaging are further exacerbated by the fact that some receiving devices 302, 304 are primarily voice based, that is, they 302, 304 provide no capability to receive text format messages. A telephone is an example of a voice based device. Other receiving devices 302, 304 are primarily text based, such as a fax machine.

One skilled in the art will appreciate that any of the above limitations can be overcome through use of special intervention apparatus 310, either In the form of a human, or a special-purpose computer, or special application software. But such capabilities are not common, and as a result, obtaining these capabilities requires a significant investment.

The present invention overcomes the above noted obstacles to both inter-network future messaging and message format translation by providing channel-transparent future messaging and format translation via servers that are connected to both a data-centric network and the telephony-centric network. Routing information, translation software (voice-to-text and text-to-voice translators), and message transmission scheduling logic are resident in the servers according to the present invention rather than being resident in originating and receiving devices. Moreover, the channel-transparent future messaging system according to the present invention can be accessed from either the telephony-centric network or the data-centric network. The present invention is more specifically described with reference to FIGS. 4 through 8.

Figure 4:
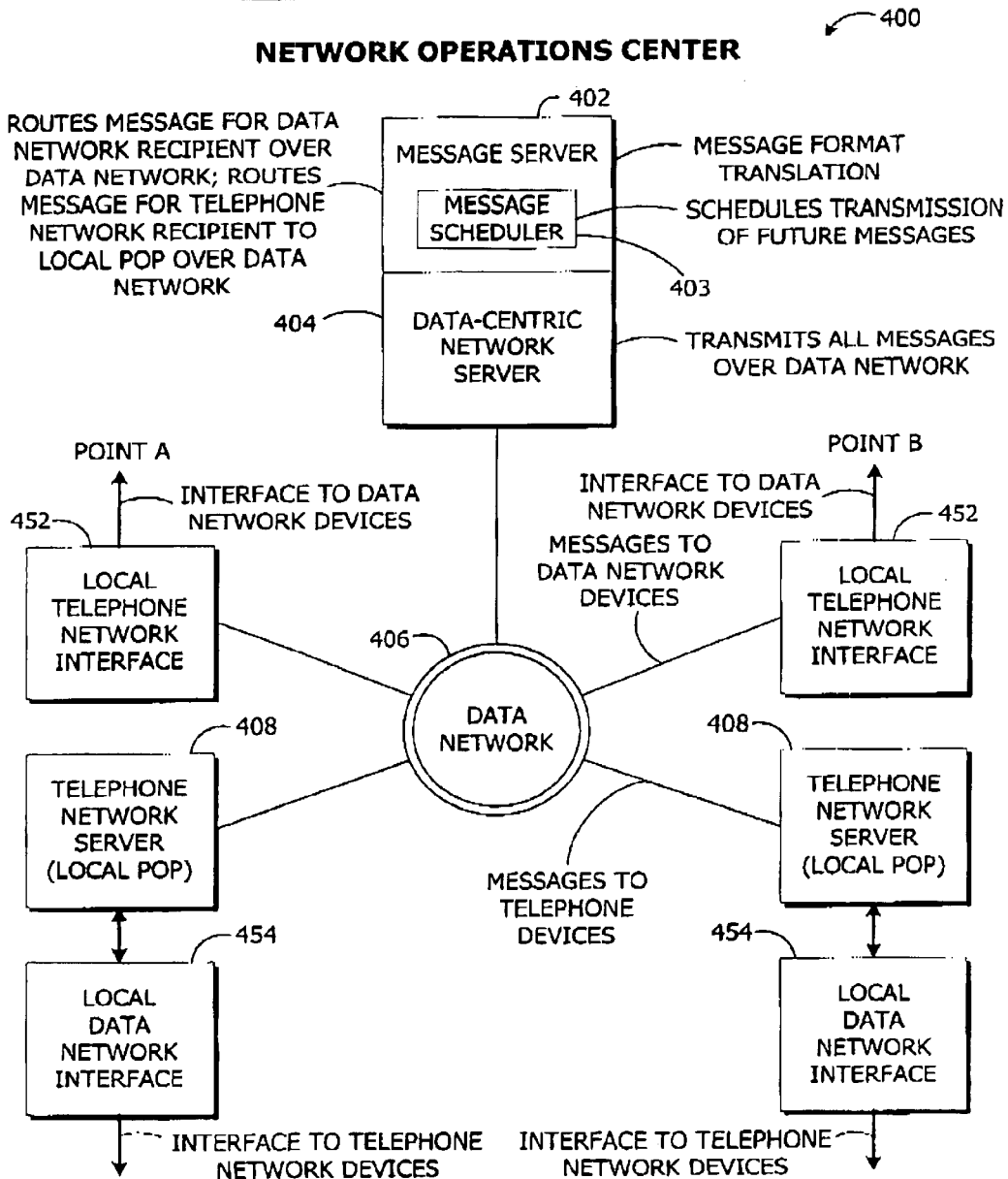
FIG. 4 is a block diagram of a channel-transparent future messaging system according to the present invention.

Now referring to FIG. 4, a block diagram is presented of a channel-transparent future messaging system 400 according to the present invention. The future messaging system 400 includes a message server 402 and a data-centric network server 404, both servers 402, 404 located at a network operations center. The data-centric network server 404 is connected to a data-centric network 406. In one embodiment, the data-centric network is the Internet, also known as the World Wide Web. In an alternative embodiment, the data-centric network 406 is a private packet-switched network. The future messaging system 400 also includes telephony-centric network servers 408 that interface to the data-centric network 406 and that communicate with corresponding local telephony-centric network interfaces 454, or local switches 454. The block diagram also depicts local data-centric network interfaces 452 that are connected to the data-centric network 406. For the ensuing discussion, the Internet embodiment is specifically described, however, one skilled in the art will appreciate that elements and techniques similar to those discussed for the Internet embodiment may be substituted for a private data-centric network embodiment.

Operationally, a user (not shown) may access the future messaging system 400 either via a telephony-centric network device (not shown) or a data-centric network device (not shown). By dialing a local telephone number, the user accesses the messaging system 400 from his/her local switch 454. The telephony-centric network server 408, or local point-of-presence (POP) 408, in one embodiment, is collocated with a corresponding local telephone switch 454. The local POP 408 converts electrical signals that are modulated for communication over the telephony-centric network into data packets for communication over the data-centric network 406. The data packets are then sent by the local POP 408 over the data-centric network 406 to the data-centric network server 404 in the Network Operations Center. The data-centric network server 404 receives the data packets transmitted over the data-centric network and provides them to the message server 402. The future messaging system 400 can also be directly accessed from a data-centric network device such as a computer. In one embodiment, a common desktop computer equipped with a thin web client (i.e., a web browser) such as Netscape® Communicator or Microsoft® Internet Explorer is used to access a web site at the network operations center. Thus the data-centric network server 404 provides network packet transmission and reception for access to the message server 402 in the network operations center.

The message server 402 maintains account and messaging information for registered users. Each registered user is issued a telephone number, an email address, and is provided with a universal resource locator (URL) corresponding to the network operations center. For example, a user in Denver is issued a telephone number having area code 303 corresponding to the local POP in Denver, an email address and a URL. The registered user can access his/her account by dialing the local telephone number or by using his web browser to access the URL.

For entry of messages in text form, the message server 402 provides a data entry web page via the web site so that the registered user can enter a message from a computer keyboard or other device connected to the data-centric network that is hypertext markup language (HTML) compatible. Message recipients can be manually entered via the data entry form or they may be selected from an address book resident in the message server. Using the address book, a recipient, say Rick, can be aliased to several receiving addresses to include a telephone number, pager number, fax number, and email address. Multiple recipients may be specified for delivery of the message. The message server 402 provides the capability to address Rick via any combination of aliased receiving devices. The message entry web page contains a field for specifying a delivery time so that a message originator can individually specify delivery times for each message that is generated.

The message server also includes translation logic and special-purpose software to translate voice-to-text and text-to-voice so that a message can be seamlessly entered, transmitted, and received. For example, if a message is entered in text form and it is addressed to a recipient having a voice-only receiving device, then the message server 402 translates the message into a format compatible for reception by the voice-only device prior to transmission. If the receiving device is a fax machine, then the message routing logic 402 translates the message into a format compatible with the fax machine prior to transmission. And because translation is performed within the message server 402, no special-purpose translation logic of software is required to be resident in an originating or receiving device. In addition, a message scheduler 403 within the message server 402 determines when to send messages that have future delivery times specified. Thus, no special intervention apparatus is required to send a future message. In one embodiment, the message scheduler 403 is a software program that reads a real-time clock (not shown) within the message server 402 to determine when it is time to deliver a message.

The message server 402 routes messages designated for receiving devices connected to the data-centric network 406 directly to the IP address of a recipient. For recipients having receiving devices connected to the telephony-centric network, the message router 1) embeds the telephone number of a receiving device into the message along with contact protocol for the receiving device, and 2) routes the message to the IP address of the local POP 408 corresponding to the embedded telephone number. Upon reception of the message, the local POP 408 directs the local switch 454 to call the receiving device over the telephony-centric network. Once the call session is secured, then the local POP 408 delivers the message over the telephony-centric network in the format provided by the message server 402.

Figure 5:
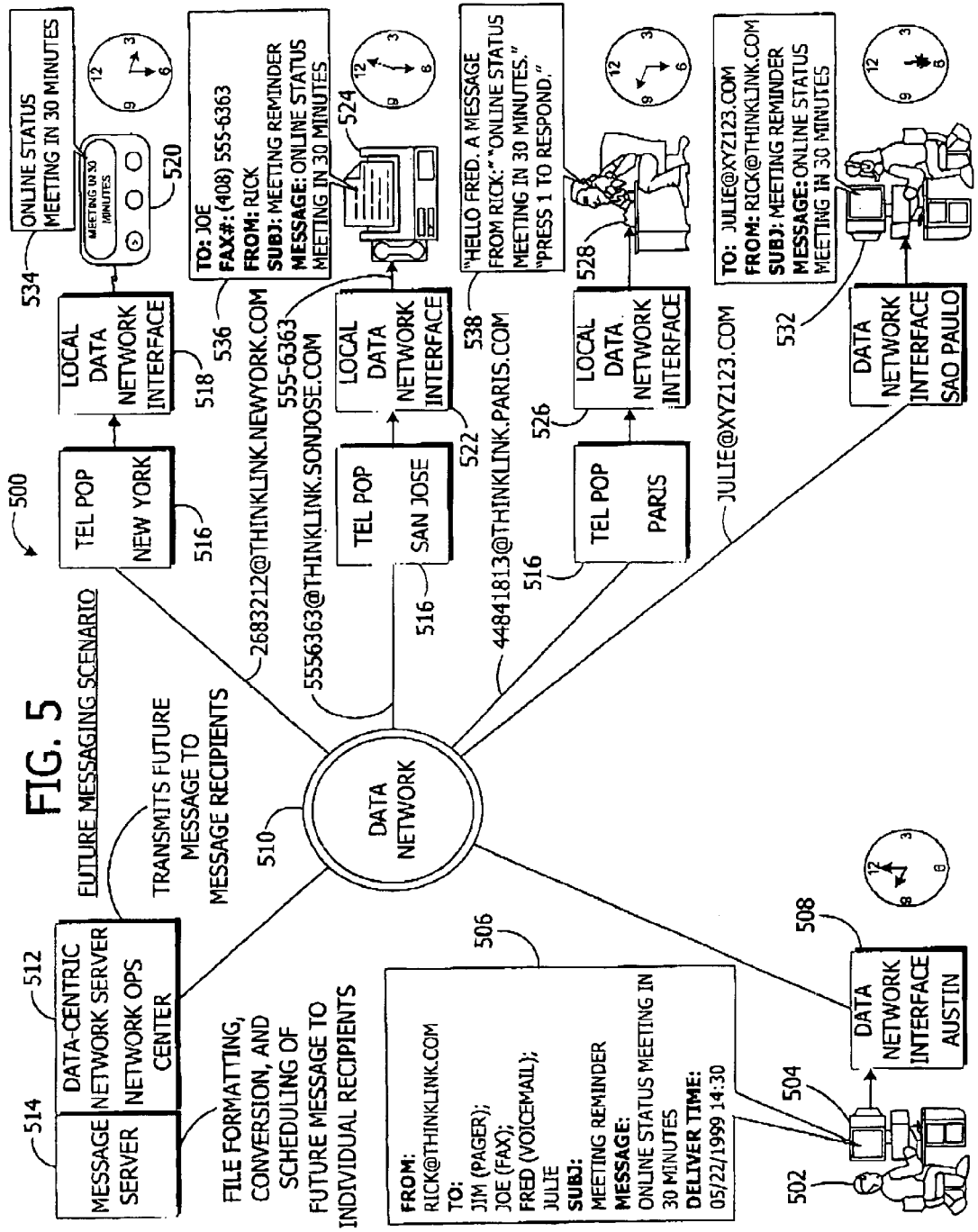
FIG. 5 is a diagram depicting a future message transmission according to the present invention to recipients having disparate receiving devices.

Now referring to FIG. 5, a diagram 500 is presented depicting future message transmission according to the present invention to recipients having disparate receiving devices. The diagram 500 shows a message originator 502, or registered user 502, in Austin, accessing the network operations center from a computer 504, composing a message 506 for transmission to four recipients, at approximately 10:00. A first recipient is in New York and has a pager 520 as a receiving device; a second recipient is in San Jose and has a fax machine 524 as a receiving device; a third recipient is in Paris and has a telephone 528 as a receiving device; and a fourth recipient is in Sao Paulo and has a computer 532 as a receiving device. The diagram 500 shows both a data-centric network server 512 and a message server computer 514 in the network operations center. The diagram 500 depicts transmission of the message over a data-centric network 510 to either a data-centric network interface 530 or to local POPs 516. The local POPs 516 are connected to corresponding local telephone switches 518, 522, 526 for interface to receiving devices 520, 524, 528 over the telephony-centric network.

In one embodiment, the message originator 502 directs his/her computer 504 to access the network operations center web site by entering the URL of the website into an address field of a web browser on the computer 504. Data packets are then routed over the data-centric network 510 via the data-centric network interface 508 in Austin to the data-centric network server 512 in the network operations center. The message server 514 issues appropriate web pages to the user for message entry, recipient addressing, and specification of delivery time by sending packets to the data-centric network address of the user's computer 504. Using the data entry web page, the user 502 composes a message 508 in email format to Jim's pager, joe's fax machine. fred's voicemail, and Julie's default receiving device, her email address. For the purposes of message composition, it is of no concern to the user 502 what transmission channel is used to contact the recipients; what the user 502 values is that the message 508 need be entered only once. In addition, the user specifies a delivery time of 2:30 Austin time. The content of the message is created to remind Jim, Joe, Fred, and Julie that they are required to participate in an online meeting with Rick and that the meeting will occur at 3:00 Austin time, which is 4:00 New York time, 1:00 San Jose time, 10:00 Paris time, and 6:00 Sao Paulo time.

The future message 506 is provided to the network operations center over the data-centric network 510. The data-centric network server 512 receives the message packets and provides them to the message server 514. The message server computer 514 then translates the message 506 into four messages 534, 536, 538, 540, each of the four messages 534, 536, 538, 540 corresponding to each of the message recipients.

Translation of the future message 506 into a first message 534 requires that 1) the telephone number of Jim's pager 520, 268-3212, be embedded; 2) the IP address of the local POP 516 in New York be used as an address for the first message 534, and 3) that the future message 506 be translated to pager-compatible format. The message server 514 accomplishes these tasks and maintains it until the specified delivery time. At 3:30 New York time, the message sever 514 provides the first message 534 to the data-centric network server 512 for delivery to the local POP 516 in New York.

Translation of the future message 506 into a second message 536 requires that 1) the telephone number of Joe's fax machine 524, 555-6363, be embedded, 2) the IP address of the local POP 516 in San Jose be used as an address for the second message 536, and 3) that the future message 506 be translated into facsimile-compatible format. The message server 514 accomplishes these tasks and maintains it until the specified delivery time. At 12:30 San Jose time, the message sever 514 provides the second message 536 to the data-centric network server 512 for delivery to the local POP 516 in San Jose.

Translation of the future message 506 into a third message 538 requires that 1) the telephone number of Fred's telephone 528, 44 84 18 13, be embedded 2) the IP address of the local POP 518 in Paris be used as an address for the third message 538, and 3) that the future message 508 be translated from textual email format to voice format. The message server 514 accomplishes these tasks and maintains it until the specified delivery time. At 9:30 Paris time, the message server 514 provides the third message 538 to the data-centric network server 512 for delivery to the local POP 518 in Paris.

Translation of the future message 506 into a fourth message 540 requires only that Julie's email address be provided as a address. This is because the future message 506 is already compatible with Julie's receiving device 532 and because Julie's receiving device 532, a computer 532, is addressable over the data-centric network 510. The message server 514 supplies Julie's email address and maintains the fourth message until the specified delivery time. At 5:30 Sao Paulo time, the message server 514 provides the fourth message 540 to the data-centric network server 512 for delivery to a local data-centric network interface 530 in Sao Paolo.

FIG. 5 depicts Internet-based email addresses for transmission of each of the four messages 534, 536, 538, 540. For the three messages 534, 536, 538 requiring access through a local switch 518, 522, 526, telephone numbers for corresponding receiving devices 520, 524, 528 have been embedded into their associated email address. Although such an embodiment is shown in FIG. 5 for transmission of the future message 506, one skilled in the art will understand that the telephone numbers and local POP information can be embedded within the message 506 itself, or provided separately.

At the specified delivery time, the data-centric network server 512 transmits packets corresponding to each of the four messages 534, 536, 538, 540 over the data-centric network 510. The local POP 516 in New York intercepts the first message 534 and directs the local switch 518 to contact Jim's pager 520 using the embedded telephone number 268-3212. The first message 534 is then delivered to Jim's pager 520. The local POP 516 in San Jose intercepts the second message 536 and directs the local switch 522 to call Joe's fax machine 524 using the embedded telephone number 555-6363. Once the call is established, the local POP 516 provides the second message 536 in fax format to Joe's fax machine 524. The local POP 516 in Paris intercepts the third message 538 and directs the local switch 526 to call Fred's telephone 528 using the embedded telephone number 44 84 18 13. Once the call is established, the local POP 516 provides the third message 538 in recorded voice format to Fred's telephone 528. The local data-centric network interface 530 in Sao Paolo simply routes the fourth message 540 to Julie's computer 532 using her data-centric network address, julie@xyz123.com.

Figure 6:
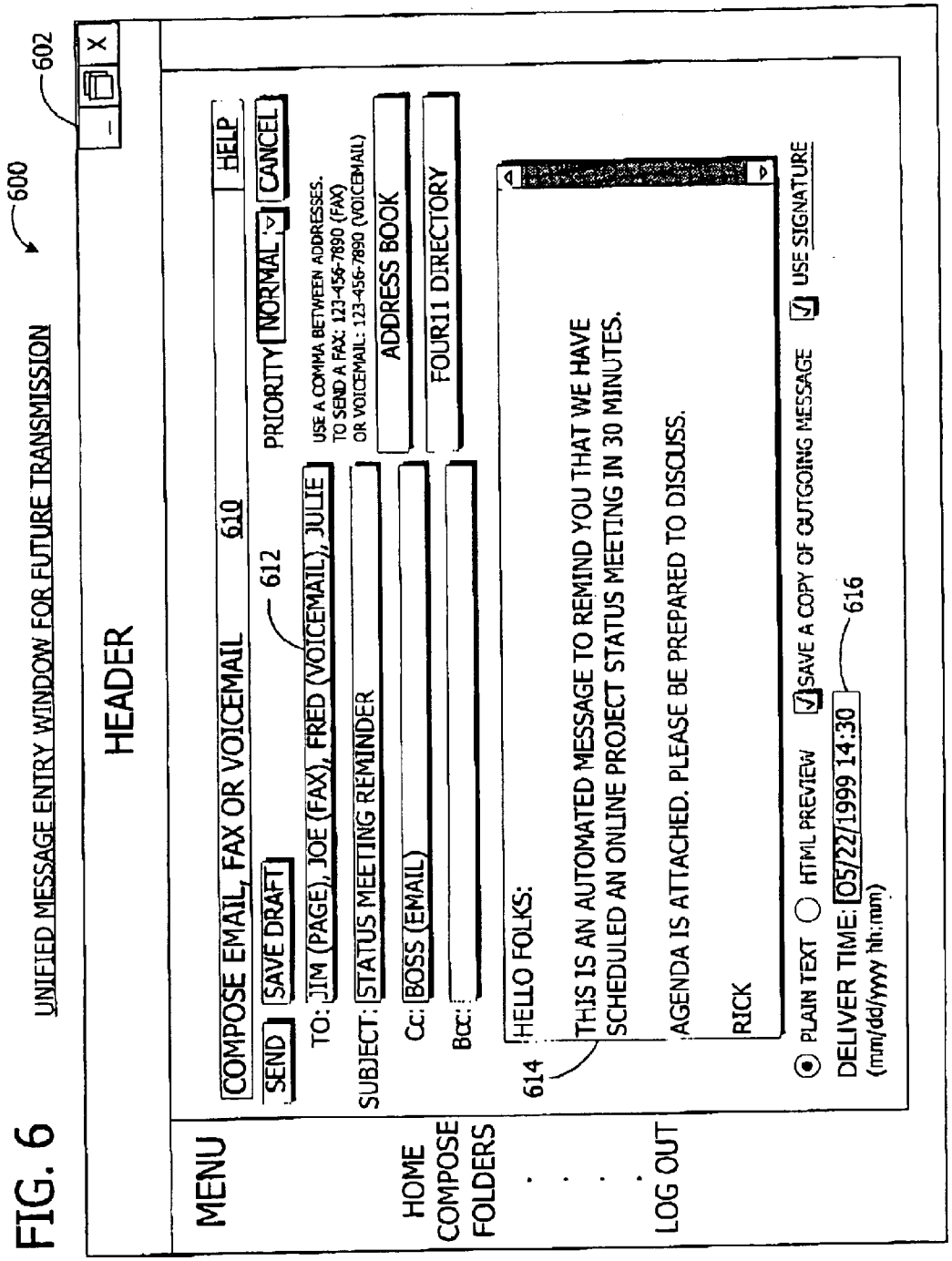
FIG. 6 is a diagram illustrating a future message data entry window web page according to the present invention.

Now referring to FIG. 6, a diagram 600 is presented illustrating a future message data entry window web page 610 according the present invention. The web page 610 is provided over a data-centric network to an originator's computer that is executing a thin web client program. The diagram 600 depicts a display 602 provided by the thin web client. The message data entry web page 610 includes a recipient field 612, a message field 614, and a delivery time field 616.

Operationally, a user accesses the message entry web page 610 by providing a universal resource locator (URL) to his/her web browser corresponding to the data-centric network server at the network operations center. In turn, the user is provided with a web page (not shown) enabling he/she to select from several options, one of which is to compose a message. The message data entry web page 610 is sent to the user's computer as a result of selecting to compose a message. The user creates the message by entering addresses of recipients within the recipient field 612, message text within the message field 614, and a time to transmit the future message within the delivery time field 616. The completed web page 610 is transmitted back to the data-centric network server and a message server in turn translates the message into formats compatible with the recipients' receiving devices. The message scheduler then transmits the message to the recipients at the scheduled delivery time, in this case May 22, 1999 at 14:30.

Future messaging as depicted in FIG. 6 has many useful applications. For example, suppose that a salesperson is traveling to a client's facility to present a proposal. If the proposal is being prepared by an outside source in voice form while the salesperson is in transit, the present invention can be employed to, say, provide a fax form of the proposal on a fax machine at the client's facility shortly after the salesperson is scheduled to arrive. Another useful application of the present invention is described with reference to FIG. 7.

Figure 7:
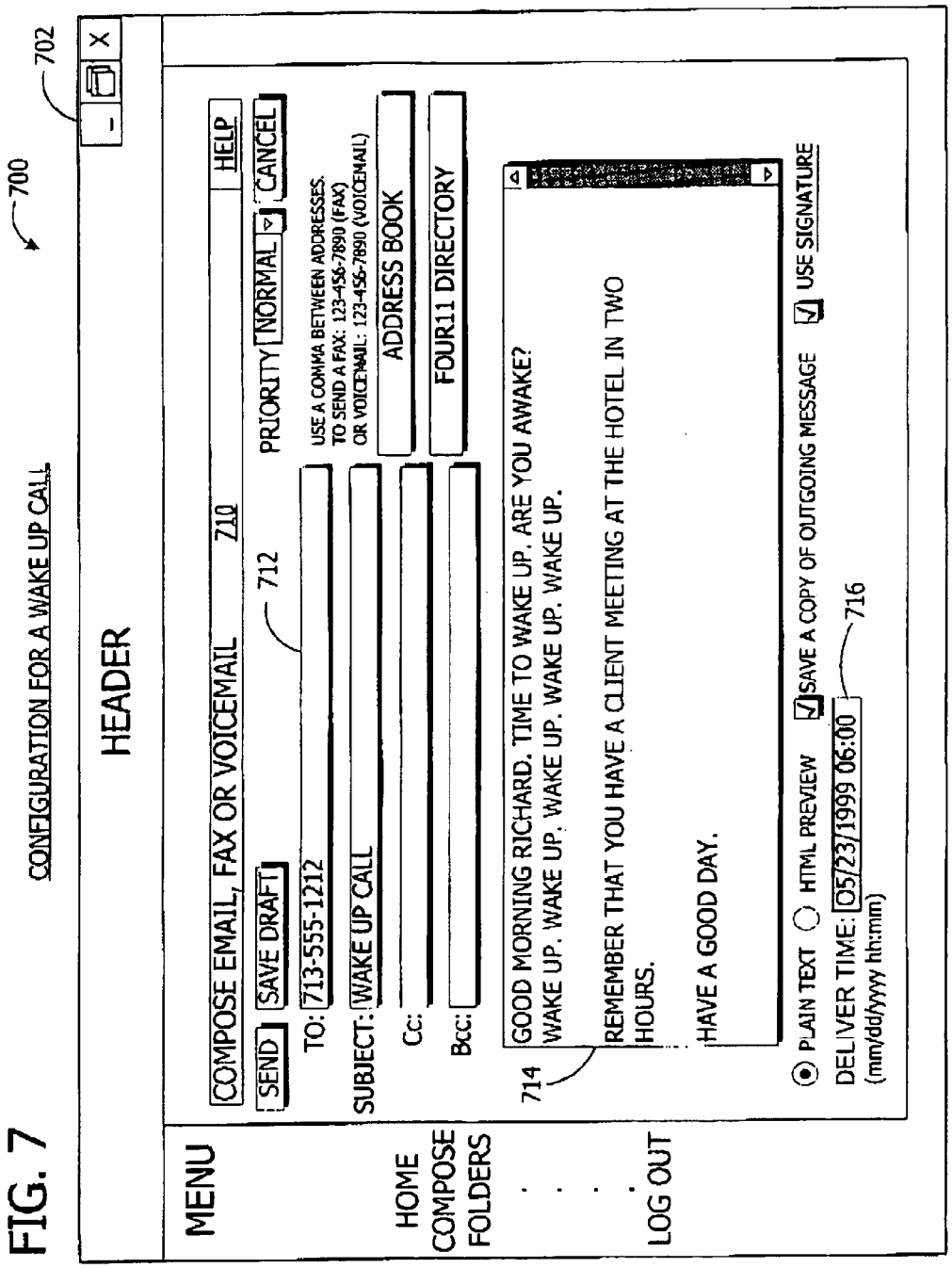
FIG. 7 is a diagram illustrating configuration of a wake-up call according to the present invention.

Referring to FIG. 7, a diagram 700 is presented illustrating configuration of a wake-up call through completion of a future message data entry window web page 710 like that shown in FIG. 6. Like elements have like descriptions, the hundreds digit being replaced by a 7.

Operationally, a wake up call is configured by entering a telephone number within the recipient field 712, a message to be read in voice form in the message field 714, and the time that the user desires to be called in the delivery time field 716. Consequently, the wake-up call will occur at the scheduled delivery time, in this case May 23, 1999 it 06:00.

The examples of FIGS. 4 through 7 show how a future message is generated and transmitted according to the present invention to disparate receiving devices at a prescribed delivery time. The receiving devices can be coupled to either the telephony-centric network or the data-centric network and selection of communication channel for transmission of the message to recipients is transparent to a message originator. The examples furthermore show how format incompatibilities between receiving devices and transmission scheduling are overcome by the present invention without a requirement for human intervention, special-purpose hardware, or special client applications.

Figure 8:
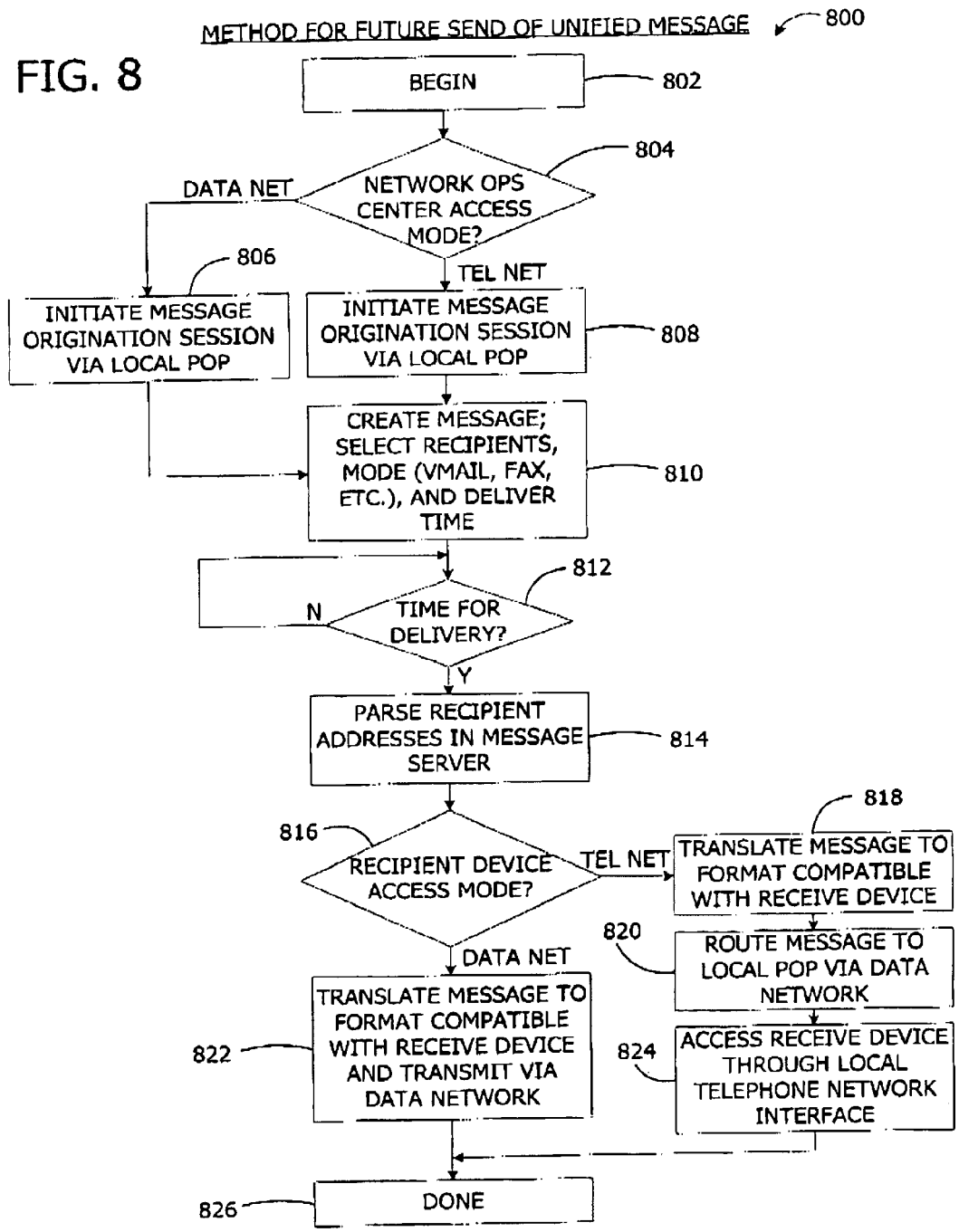
FIG. 8 is a flow chart of a method according to the present invention for configuring and delivering a message at a future time to a receiving device that is addressable over a telephony-centric network or to a receiving device that is addressable over a data-centric network.

Now referring to FIG. 8, a flow chart 800 is presented of a method according to the present invention for configuring and delivering a message at a future time to a receiving device that is addressable over a telephony-centric network or to a receiving device that is addressable over a data-centric network.

Flow begins at block 802 where a user initiates a session at the network operations center to enter a message for future transmission. Flow then proceeds to decision block 804.

At decision block 804, it is determined whether the user is originating the message via a device connected to the telephony-centric network or a device connected to a data-centric network. If the origination device is connected to the data-centric network, then flow proceeds to block 806. If the origination device is connected to the telephony-centric network, then flow proceeds to block 808.

At block 806, a data-centric network server at the network operations center intercepts packets from the data-centric network originated by the user and establishes a session for entry of the future message over the data-centric network. A message entry web page is provided over the data-centric network to the user. Flow then proceeds to block 810.

At block 808, a local POP corresponding to the user's telephone number directs packets over the data-centric network to the data-centric network server. A message entry session is established via the local POP in a format Flow then proceeds to block 810.

At block 810, the user creates a message in the format obtained via block 806 or 808. The user also selects recipients for the broadcast message either directly or by using his/her address book stored at the network operations center. For recipients having multiple receiving devices, the user specifies a particular receiving device for delivery. In addition, the user specifies a future delivery time for the message. Flow then proceeds to decision block 812.

At decision block 812, a message server at the network operations center periodically reads the current time and determines if the prescribed delivery time is present. If it is time to transmit the message, then flow proceeds to block 814. If not, then flow proceeds to this decision block 812.

At block 814, the message server at the network operations center parses the broadcast message according to each specified recipient into corresponding individual messages. Flow then proceeds to decision block 816.

At decision block 816, the message server evaluates how to access each receiving device corresponding to each message recipient. If a message recipient's receiving device is connected to the telephony-centric network, then flow proceeds to block 818. If a message recipient's receiving device is connected to the data-centric network, then flow proceeds to block 822.

At block 818, individual messages for receiving devices connected to the telephony-centric network are translated, if necessary, from the format in which the future message was entered in block 810 into a format compatible with a designated receiving device. Flow then proceeds to block 820.

At block 820, individual messages designated for delivery to receiving devices connected to the telephony-centric network are transmitted over the data-centric network to a local POP corresponding to a telephone number embedded in each individual message. Flow then proceeds to block 824.

At block 824, the local POP accesses a receiving device by providing the number to a local telephone switch and subsequently delivers the future message in the format provided by block 818. Flow then proceeds to block 826.

At block 816, individual messages for receiving devices connected to the data-centric network are translated, if necessary, from the format in which the future message was entered in block 810 into a format compatible with designated receiving devices and the individual messages are transmitted over the data-centric network and delivered to the designated receiving devices. Flow then proceeds to block 826.

At block 826, the method completes.

Although the present invention and its objects, features, and advantages have been described in detail, other embodiments are encompassed by the invention. For example, the present invention has been particularly characterized by transmission of messages over the Internet data-centric network. Although the Internet is widely used today for transmission of messages between communication devices, the present invention is not dependent upon such capability being provided. The data-centric network element according to the present invention can be embodied as a private network utilizing proprietary or leased communication channel assets.

In addition, the present invention has been specifically discussed with reference to commonly found receiving devices such as telephones, fax machines, computers, and pagers, however, such devices do not restrict application of the present invention. Any device having a telephone number or data-centric network address that provides either voice or text format communication capability may be applied to the present invention.

Furthermore, the present invention has been characterized in terms of voice format and text format messaging because such formats are commonly employed at present. In the near future enabling technologies may permit the proliferation of video telephones or video data-centric network communication devices. The present invention comprehends incorporation of video-based formats and devices into all aspects of future messaging.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for sending a message having a recipient field identifying one of a plurality of receiving devices, wherein each receiving device has a different format than the other receiving devices, each said receiving device coupled to at least one of a data-centric network and a telephony-centric network, the apparatus comprising:

a message server configured to translate the message into a plurality of formats, each format compatible with one of the receiving devices specified in the recipient field;

a data-centric network link, coupled to said message server, configured to transmit the message over the data-centric network;

a telephony-centric network link, coupled to said message server, configured to transmit the message over the telephony-centric network;

wherein, if the receiving device is addressed by accessing an internet protocol address over the data-centric network, then said message server delivers the translated message to the receiving device over the data-centric network via the data-centric network link; and wherein, if the receiving device is addressed by a telephone number via the telephony-centric network, then said message server delivers the translated message to the receiving device over the telephony-centric network via the telephony-centric network link.

2. The apparatus as recited in claim 1, wherein the receiving device is addressed by accessing an internet protocol (IP) address over the data-centric network and said message server delivers the translated message to the addressed receiving device over the data-centric network via the data-centric network link.

3. The apparatus as recited in claim 1, wherein the message is supplied to the message server by an originator.

4. The apparatus as recited in claim 3, wherein said originator supplies the message in text or voice form from an originating device that is addressable over the telephony-centric network.

5. The apparatus as recited in claim 3, wherein said originator supplies the message in text or voice form from an originating device that is addressable over the data-centric network.

6. The apparatus as recited in claim 5, wherein said data-centric network server transmits a message entry web page to said originator for configuration of the message.

7. The apparatus as recited in claim 6, wherein said originating device comprises a computer that is executing a thin web client to receive said message entry web page.

8. The apparatus as recited in claim 7, wherein said thin web client comprises a browser.

9. The apparatus as recited in claim 8, wherein said originator prescribes the receiving device and the message completing fields within said message entry web page.

10. The apparatus as recited in claim 1, wherein the message is delivered to the receiving device in text format as an email, or as a fax, or as a text file.

11. The apparatus as recited in claim 1, wherein the message is delivered to the receiving device in voice format as an electronic voice file.

12. The apparatus as recited in claim 1, wherein said message server selects said format for delivery according to receiving capabilities of the receiving device.

13. The apparatus as recited in claim 12, wherein if the receiving device is addressable over the telephony-centric network, said message server includes a telephone number within the message that corresponds to the receiving device.

14. The apparatus as recited in claim 13, wherein said telephony-centric network server extracts said telephone number from within a field of the message for initiating a call over the telephony-centric network to the receiving device for delivery of the message.

15. The apparatus of claim 1 wherein the message has a data structure, comprising:
   a recipient field identifying one of a plurality of receiving devices having one of a plurality of different recipient formats; and
   a message field having one of a plurality of different message formats.

16. The apparatus as recited in claim 15, wherein the plurality of receiving devices comprise a telephone, a facsimile machine, a pager, a smart pager, a cellular telephone, a personal digital assistant, or a desktop computer and wherein the plurality of different message formats comprises a text format and a voice format.

17. A mechanism for sending to a receiving device a message having a field prescribing the receiving device being coupled to either a data-centric network or a telephony-centric network, the mechanism comprising:
   a message server, for translating the message into a format compatible with the receiving device, and for initiating delivery of the message, said message server comprising:
   a message scheduler, for causing said message server to initiate delivery of the message; and
   a data-centric network server, coupled to sad message server, for transmitting the message over a data-centric network for delivery to the receiving device wherein the receiving device is addressed by accessing an internet protocol address over the data-centric network.

18. The mechanism as recited in claim 17, wherein the receiving device is addressed by dialing a telephone number over the telephony-centric network.

19. The mechanism as recited in claim 18, wherein the receiving device comprises a telephone, a facsimile machine, a pager, a smart pager, or a cellular telephone.

20. The mechanism as recited in claim 17, wherein the receiving device comprises a computer.

21. The mechanism as recited in claim 17, wherein the message is supplied to the message server by an originator.

22. The mechanism as recited in claim 21, wherein said originator supplies the message an text or voice form from an originating device that is addressable over the telephony-centric network.

23. The mechanism as recited in claim 21, wherein said originator supplies the message in text or voice form from an originating device that is addressable over the data-centric network.

24. The mechanism as recited in claim 23, wherein said data-centric network server transmits a message entry web page to said originator for configuration of the message.

25. The mechanism as recited in claim 24, wherein said originating device comprises a computer that is executing a thin web client to receive said message entry web page.

26. The mechanism as recited in claim 25, wherein said thin web client comprises a browser.

27. The mechanism as recited in claim 26, wherein said originator prescribes the recipient, the receiving device and the message by completing fields within said message entry web page.

28. The mechanism as recited in claim 17, wherein the message is delivered to the receiving device in text format as an email, or as a fax, or as a text file.

29. The mechanism as recited in claim 17, wherein the message is delivered to the receiving device in voice format as an electronic voice file.

30. The mechanism as recited in claim 17, wherein said message server selects said format for delivery according to receiving capabilities of the receiving device.

31. The mechanism as recited in claim 30, wherein, if the receiving device is addressable over the telephony-centric network, said message server includes a telephone number within the message that corresponds to the receiving device.

32. The mechanism as recited in claim 30, further comprising:
   a telephony-centric network server, coupled to said data-centric network server, for extracting said telephone number from within the message and for initiating a call over the telephony-centric network to the receiving device for delivery of the message.

33. The mechanism of claim 17 wherein the message has a data structure, comprising:
   a recipient field identifying one of a plurality of receiving devices having one of a plurality of different recipient formats; and
   a message field having one of a plurality of different message formats.

34. The mechanism as recited in claim 33, wherein the plurality of receiving devices comprise a telephone, a facsimile machine, a pager, a smart pager, a cellular telephone, a personal digital assistant, or a desktop computer and wherein the plurality of different message formats comprises a text format and a voice format.

35. A system for sending a message to a receiving device, the system comprising:
   a message scheduler, configured to initiate delivery of the message;

a message server, coupled to said message scheduler, configured to translate the message into a format that is compatible with the receiving device;

a data-centric network server, coupled to said message server, configured to transmit the message;

a data-centric network, coupled to said data-centric network server, configured to route the message from said data-centric network server to either the receiving device or a telephony-centric network server, wherein, if the receiving device is addressed by a telephone number over a telephony-centric network, then said data-centric network routes the message to said telephony-centric network server.

36. The system as recited in claim 35, wherein, if said receiving device is addressable over said data-centric network, then the message is routed directly to said receiving device.

37. The system as recited in claim 36, wherein the receiving device comprises a telephone, a facsimile machine, a pager, a smart pager, a computer, or a cellular telephone.

38. The system as recited in claim 37, wherein the receiving device is addressed by accessing an internet protocol (IP) address over said data-centric network or by dialing a telephone number over said telephony-centric network.

39. The system as recited in claim 38, wherein an originator supplies the message in voice form from an originating device that is addressable over the telephony-centric network.

40. The system as recited in claim 38, wherein said originator supplies the message in text or voice form from an originating device that is addressable over the data-centric network.

41. The system as recited in claim 40, wherein said originating device comprises a computer that is executing a web browser.

42. The system as recited in claim 41, wherein said data-centric network server transmits a message entry web page to said originating device for configuration of the message.

43. The system as recited in claim 42, wherein said originator prescribes the receiving device and the message by completing fields within said message entry web page.

44. The system as recited in claim 43, wherein the message is delivered to the receiving device in text format as an email, or as a fax, or as a text file.

45. The system as recited in claim 43, wherein the message is delivered to the receiving device in voice format as an electronic voice file.

46. The system as recited in claim 45, wherein said message server selects said format for delivery according to receiving capabilities of the receiving device.

47. The system as recited in claim 46, wherein said telephony-centric network server extracts said telephone number from within a field of the message and initiates a call over said telephony-centric network to the receiving device for delivery of the message.

48. The system of claim 35 wherein the message has a data structure, comprising:

a recipient field identifying one of a plurality of receiving devices having one of a plurality of different recipient formats; and a message field having one of a plurality of different message formats.

49. The system as recited in claim 48, wherein the plurality of receiving devices comprise a telephone, a facsimile machine, a pager, a smart pager, a cellular telephone, a personal digital assistant, or a desktop computer and wherein the plurality of different message formats comprises a text format and a voice format.

50. A method for sending a message having a recipient field identifying one of a plurality of receiving devices, wherein each receiving device has a different format than the other receiving devices, each said receiving device coupled to at least one of a data-centric network and a telephony-centric network, the method comprising:

a) generating the message from an originating device;

b) for each receiving device specified in the recipient field, translating the message into a format that is compatible with the receiving device;

c) transmitting the message over the coupled network to each receiving device prescribed in the recipient field in a format compatible with the receiving device wherein the originating device is addressable via the coupled network.

51. The method as recited in claim 50, wherein the originating device is addressable via a telephony-centric network.

52. The method as recited in claim 51, wherein the originating device is addressable via the data-centric network.

53. The method as recited in claim 52, wherein the originating device is a computer that is executing a thin web client.

54. The method as recited in claim 53, wherein the message is generated by completing fields within a message entry web pane that has been received over the data-centric network.

55. The method as recited in claim 54, wherein the receiving device comprises a telephone, a facsimile machine, a pager, a smart pager, a computer, or a cellular telephone and the translated message is delivered to the receiving device over the telephony-centric network.

56. The method as recited in claim 55, further comprising:

i) embedding a telephone number in the message;

ii) causing the telephony-centric network server to call the telephone number to access the receiving device.

57. The method as recited in claim 56, wherein the message is delivered to the receiving device in text format as an email, or as a fax, or as a text file.

58. The method as recited in claim 56, wherein the message is delivered to the receiving device in voice format as an electronic voice file.

59. The method of claim 50, wherein the message has a data structure, comprising:

a recipient field identifying one of a plurality of receiving devices having one of a plurality of different recipient formats; and a message field having one of a plurality of different message formats.

60. The method as recited in claim 59, wherein the plurality of receiving devices comprise a telephone, a facsimile machine, a pager, a smart pager, a cellular telephone, a personal digital assistant, or a desktop computer and wherein the plurality of different message formats comprises a text format and a voice format.

* * * * *